United States Patent
Kunelius et al.

(10) Patent No.: US 12,502,059 B2
(45) Date of Patent: Dec. 23, 2025

(54) LARYNGOSCOPE HANDLE INSERT

(71) Applicant: MedSource International LLC, Chanhassen, MN (US)

(72) Inventors: David Kunelius, Waconia, MN (US); Benjamin Beniek, Shakopee, MN (US); Sikandar Hayat, Sialkot (PK)

(73) Assignee: MedSource International LLC, Chanhassen, MN (US)

( * ) Notice: Subject to any disclaimer, the term of this patent is extended or adjusted under 35 U.S.C. 154(b) by 460 days.

(21) Appl. No.: 17/893,863

(22) Filed: Aug. 23, 2022

(65) Prior Publication Data

US 2024/0065539 A1 Feb. 29, 2024

(51) Int. Cl.
*A61B 1/267* (2006.01)
*A61B 1/06* (2006.01)

(52) U.S. Cl.
CPC ............ *A61B 1/267* (2013.01); *A61B 1/0655* (2022.02); *A61B 1/0684* (2013.01)

(58) Field of Classification Search
CPC ..... A61B 1/267; A61B 1/0655; A61B 1/0684; A61B 1/07; A61B 1/24
See application file for complete search history.

(56) References Cited

U.S. PATENT DOCUMENTS

| | | | | |
|---|---|---|---|---|
| 4,607,623 A * | 8/1986 | Bauman | ............... | A61B 1/0669 362/217.05 |
| 9,883,792 B2 * | 2/2018 | McMahon | ......... | A61B 1/00105 |
| 11,219,353 B2 * | 1/2022 | Elbaz | ................. | A61B 1/00137 |
| 2003/0092967 A1 * | 5/2003 | Fourie | .................. | A61B 1/0625 600/191 |
| 2007/0093693 A1 * | 4/2007 | Geist | .................. | A61B 1/00032 600/199 |
| 2009/0112067 A1 * | 4/2009 | Baker | .................... | A61B 1/233 600/199 |
| 2010/0022843 A1 | 1/2010 | Pecherer et al. | | |
| 2011/0134234 A1 | 6/2011 | Kim | | |
| 2017/0325667 A1 * | 11/2017 | Alonso Babarro | ......................... | A61M 16/0488 |
| 2021/0290040 A1 * | 9/2021 | Elbaz | .................. | A61B 5/1455 |

FOREIGN PATENT DOCUMENTS

| | | |
|---|---|---|
| CN | 204274397 U | 4/2015 |
| CN | 204971188 U | 1/2016 |

OTHER PUBLICATIONS

International Search Report and Written Opinion issued for PCT/US2023/030829 dated Dec. 12, 2023.

* cited by examiner

*Primary Examiner* — Eduardo C Robert
*Assistant Examiner* — Holly Joanna Lane
(74) *Attorney, Agent, or Firm* — Westman, Champlin & Koehler, P.A.; Amanda M. Prose

(57) ABSTRACT

An insert for a laryngoscope handle, the insert comprising a frame supporting a light source, a light source activation guide, a spring, and one or more batteries therein wherein the one or more batteries are positioned between a top and a bottom of the spring and wherein the light source activation guide is located on an upper end of the frame above the top of the spring. The light source activation guide has a slot extending along a length of the upper end of the frame wherein the upper end of the frame slidably receives the light source therein an protrusion on the light source is slidably retained in the slot.

7 Claims, 5 Drawing Sheets

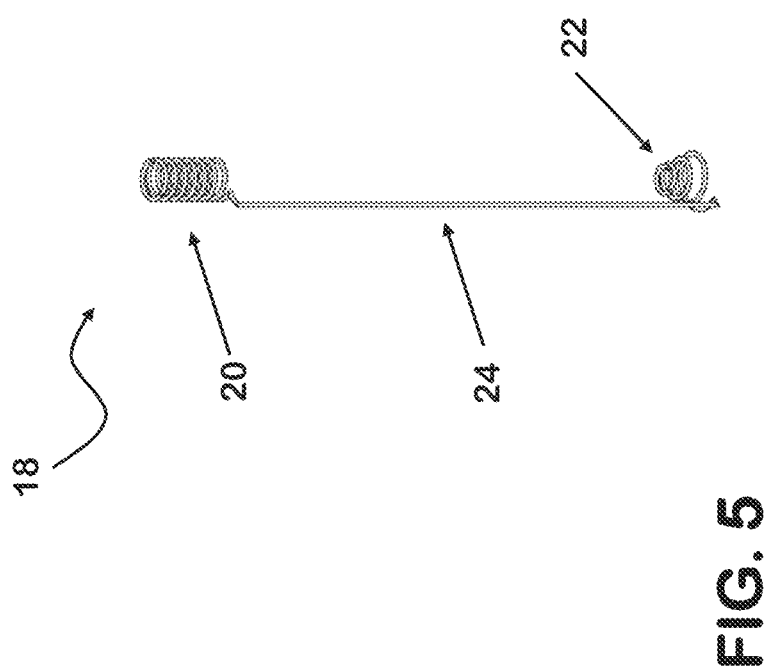

LARYNGOSCOPE HANDLE INSERT

BACKGROUND

The present invention relates laryngoscopes and more specifically to an insert for a laryngoscope handle configured with a light activation mechanism on a top of the handle.

Laryngoscopes are intended to illuminate the larynx or vocal cords for visual inspections. One style of the laryngoscope can be inserted into the patient's mouth to hold down the patient's tongue for a clear view of the patient's throat.

The demand for disposable medical supplies has grown, spurred by the increase in geriatric patients and expanded insurance coverage from the Patient Protection and Affordable Care Act in the U.S. Healthcare organizations have turned to disposables as a response to increased pressure from federal, accreditation organizations and other regulatory bodies to prevent patient and staff harms.

The primary reason for creating disposable devices is infection control. When an item is used only once by a caregiver, it cannot transmit infectious agents to subsequent patients.

While an obvious factor in the design of single-use products could be considered cost, given the nature of medical devices, disposable medical devices require a careful balance between performance, cost, reliability, materials, and shelf life.

Currently, disposable-device assembly depends primarily on injection-molded plastic pieces and/or assembly by bonding, gluing, ultrasonic welding or radio-frequency welding. The high production volume of single-use devices calls for an automated assembly in clean rooms to minimize human contact. Unlike reusable devices, which are often sterilized at the healthcare facility, disposable devices are sterilized before leaving a manufacturing site and are thus provided in a ready-to-use state.

Push button light sources are provided on laryngoscope handles and are prone to movement or misalignment due to the nature of the internal circuit completion within the laryngoscope handle.

SUMMARY

An aspect of the present disclosure relates to an insert for a laryngoscope handle, the insert comprising a frame supporting a light source, a light source activation guide, a spring, and one or more batteries therein wherein the one or more batteries are positioned between a top and a bottom of the spring and wherein the light source activation guide is located on an upper end of the frame above the top of the spring.

The light source activation guide comprises a slot extending along a length of the upper end of the frame, wherein the upper end of the frame slidably receives the light source therein.

The light source is provided in a housing that is slidable within the upper end of the frame and wherein the housing comprises a protrusion on an external surface thereof that is slidable in reciprocal directions within the slot of the light source activation guide.

A second slot extending along the length of the upper end of the frame and wherein the housing comprises a second protrusion on an external surface thereof that is also slidable in reciprocal directions within the second slot of the light source activation guide is provided in one or more embodiments.

The light source is a push button LED light source, and the light source is configured to be pressed against the top of the spring and retained in positioned by the light source activation guide to continuously activate the light source when the light source is depressed.

The frame comprises one or more openings for removable insertion of one or more batteries between the top and the bottom of the spring.

The spring comprises a top coiled length and a bottom coiled length spaced apart by a non-coiled length and wherein the spring is positioned in the frame and wherein the one or more batteries are positioned in the frame between the top coiled length and bottom coiled length of the spring.

Another aspect of the present disclosure relates to a method of providing illumination to a laryngoscope comprising providing an assembly comprising a frame supporting a light source with a light source activation guide, a spring, and a power source; inserting the assembly into a cavity in the laryngoscope handle; capping an end of the laryngoscope handle; attaching a blade to the laryngoscope handle; engaging the blade with the light source and depressing the light source for activating the light source; and sliding a protrusion on the light source within a corresponding slot on the frame to guide activation of the light source.

The method further comprises inserting the power source between opposing ends of the spring.

Yet another aspect of the present disclosure relates to a removable laryngoscope light source with light activation guide assembly comprising a light source provided in a light source housing, the light source housing having one or more protrusions on an external surface of the light source housing; and a frame having an upper end configured to slidably receive the light source housing therein and having one or more vertical slots along a length of the upper end, wherein the one or more protrusions are slidably coupled to the one or more slots for guiding reciprocal movement of the light source housing during activation of the light source.

The frame further comprises a lower end providing a floor and a length therebetween, the length having one or more openings therein and wherein the frame receives a spring and one or more batteries therein.

The one or more batteries are positioned between a top coiled length and a bottom coiled length of the spring.

The frame and light source are removably insertable into a cavity in a handle of a laryngoscope.

BRIEF DESCRIPTION OF THE DRAWINGS

FIG. 5 is front view of a switch and circuit component of the insert.

DETAILED DESCRIPTION

Figure 1:
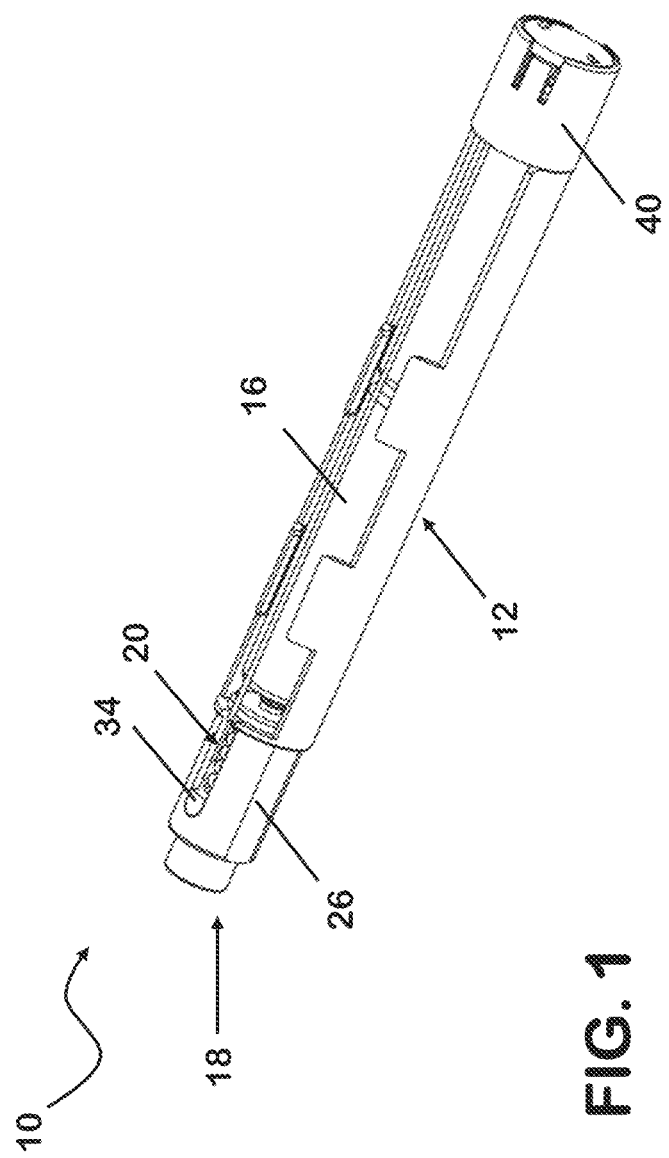
FIG. 1 is a front perspective view of a laryngoscope handle insert.

Described herein is a mini handle laryngoscope insert which supports illumination and power components for a laryngoscope. The insert is configured to fit within a laryngoscope handle or shell thereof. The assembly described herein is an insert configured for slidable placement into a laryngoscope handle having an open bottom and interior space for electrical and light components, and with a handle cap to close the interior space of the handle.

The assembly is an insert comprising a frame for supporting a light source and power source, as well as a light source activation guide and spring. The power source may be one or more batteries, and the power source is positioned between a top portion of the spring and a bottom portion of the spring. When the light source is depressed, a surface of the housing is slidable within the activation guide on the frame, which aids in retaining the light source in place and in electrical contact with the spring and power source. Depressing the light source also compresses the top of the spring between the electrical contact for the light source and the power source. The power source is then also compressed against the bottom of the spring, which is biased against a floor section of the insert frame. Thus, as the light source, which extends upwardly from the top of the insert frame, is activated and exposed by downward force applied to the housing of the light source.

The entire assembly can then be removably inserted into the handle of a laryngoscope for illumination of a laryngoscope blade attached to said handle and in contact with the light source housing.

The assembly has an outside diameter that about the same or less than the inner diameter of the open interior of the laryngoscope handle so that the insert can be easily slid into and out of the handle. The outside diameter of the insert is also large enough to allow the insert to be securely retained within the handle, without consequential movement of the insert. The insert also has a length that is substantially coextensive with the length of the handle such that the insert generally fits snugly into the handle. When the insert is installed in the laryngoscope handle, a light source supported on the insert is visible through an opening in the top of the handle, and a floor of the insert is held in place in the handle by the handle cap.

The assembly described herein removably supports the internal arrangement of components of a lighted laryngoscope handle and allows the insert to fit within the outer shell of the laryngoscope handle and mitigate any movement of the internal components therein. The light source and power source and fully contained or held in the insert and operable to activate the light source on its own, that is, the light source can be activated without the assembly being inserted into a laryngoscope handle and no structure in the handle is required to activate the light source in one or more embodiments. However, a blade installed on the handle with the assembly inserted in the handle will activate the light source when the blade is engaged with the light source.

In one embodiment, the assembly comprises a frame supporting a light source, a light source activation guide, a spring, and one or more batteries therein. The light source activation guide includes a slot extending along a length of the upper end of the frame, wherein the upper end of the frame slidably receives the light source housing therein. The light source is provided in a housing that is slidable within the upper end of the frame, and the housing comprises a protrusion on an external surface thereof that is slidable in reciprocal directions within the slot of the light source activation guide. In one or more embodiments, the activation guide includes a second slot extending along the length of the upper end of the frame and correspondingly, the light source housing comprises a second protrusion on its perimeter or external surface that is also slidable in reciprocal directions within the second slot of the light source activation guide.

When the light source is a push button LED light source, the light source is configured to be pressed against the top of the spring and retained in positioned by the light source activation guide to continuously activate the light source when the light source is depressed. An electrical contact portion of the light source contacts the spring and the power source for activation.

In another embodiment, the assembly is a removable laryngoscope light source with light activation guide assembly where the light source is provided in a light source housing that has one or more protrusions on an external surface. A frame having an upper end configured to slidably receive the light source housing therein also has one or more vertical slots along a length of the upper end. The one or more protrusions are slidably coupled to the one or more slots for guiding reciprocal movement of the light source housing during activation of the light source.

The frame further comprises a lower end providing a floor and a length therebetween, the length having one or more openings therein and wherein the frame receives a spring and one or more batteries therein.

The frame and light source are removably insertable into a cavity in a handle of a laryngoscope.

One or more components of the assembly described herein may be comprised of a plastic or resin material, or a lightweight and durable metal such as aluminum or stainless steel.

Figure 2:
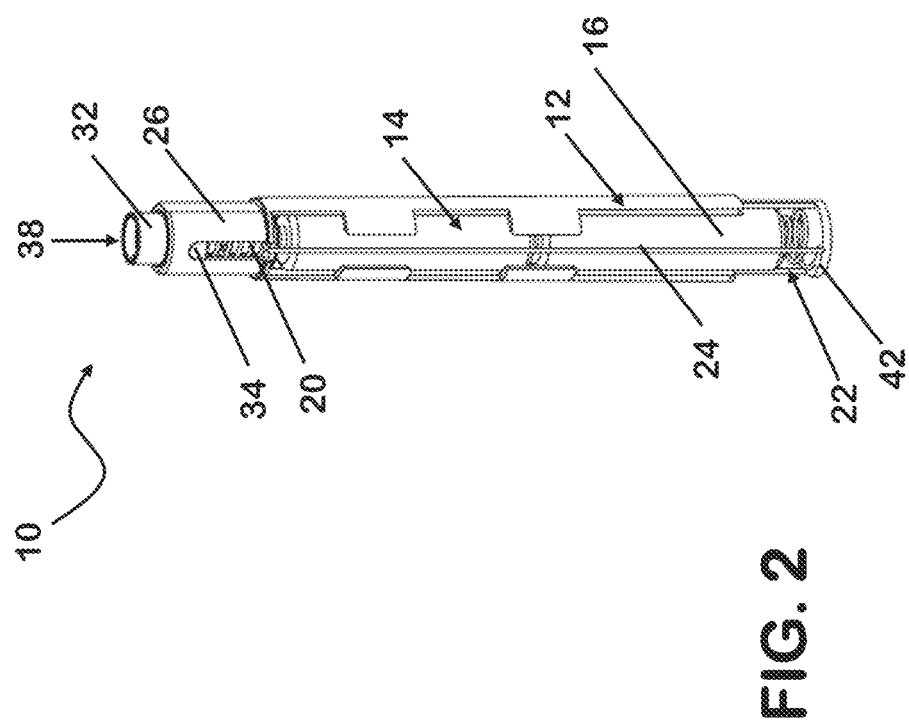
FIG. 2 is a side view of the handle insert with base cap removed.
Figure 3:
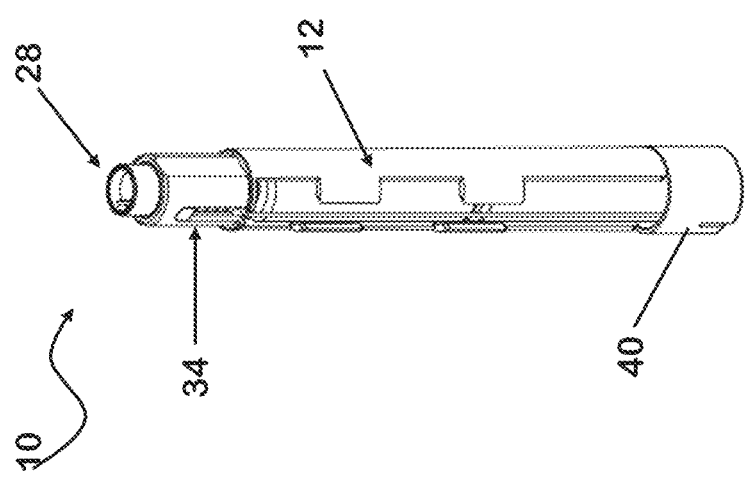
FIG. 3 is another side view of the handle insert with base cap installed.
Figure 4:
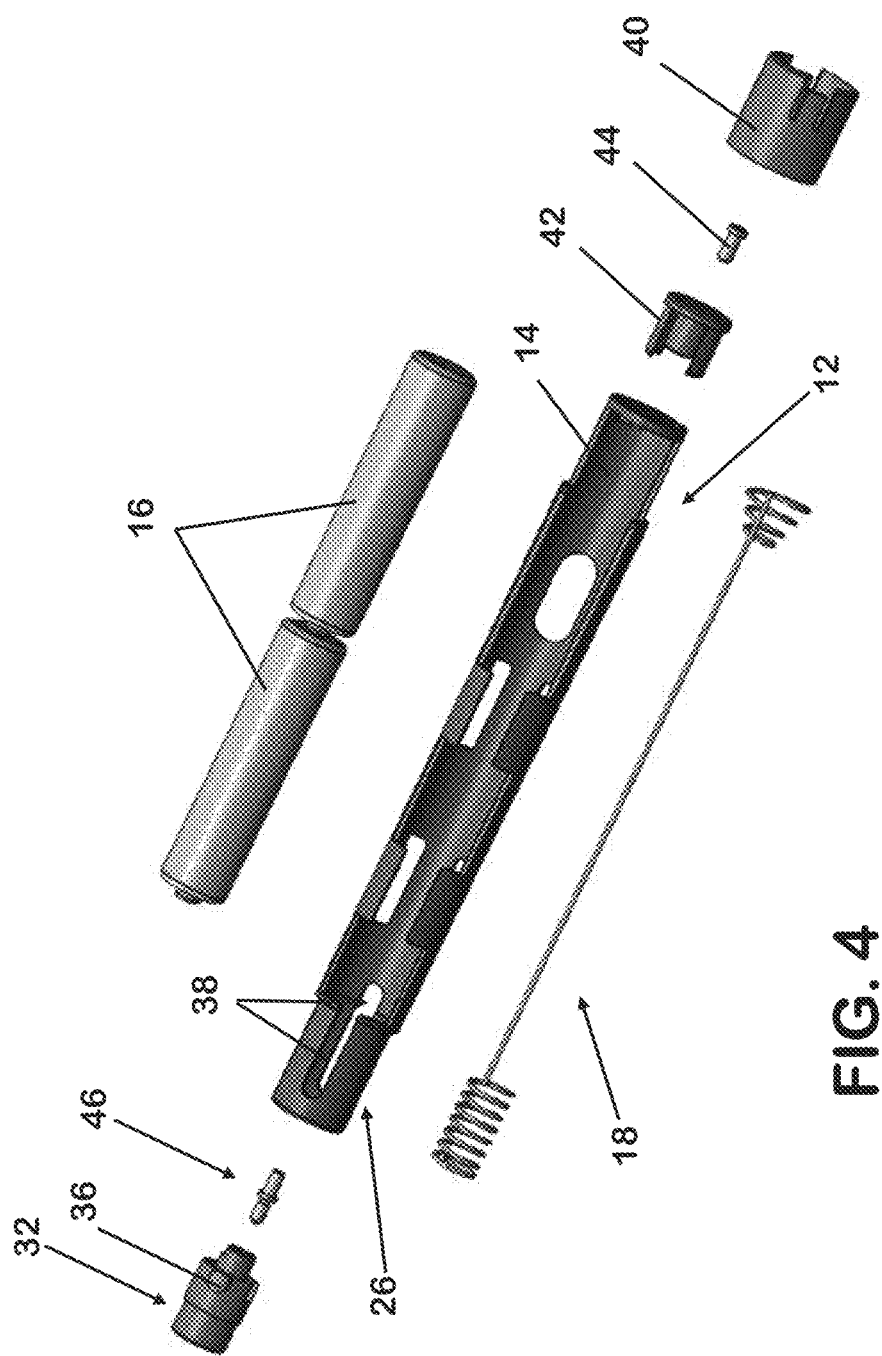
FIG. 4 is an exploded view of the insert for the laryngoscope handle.

One embodiment of an assembly 10 is illustrated in FIGS. 1-5. The assembly 10 is also referred to herein as an insert 10 and comprises a housing or frame 12 which has a diameter and length that allows the housing 12 to fit within the shell of a laryngoscope handle. The housing or frame 12 further includes a plurality of openings, including an opening 14 for receiving and holding one or more batteries 16 therein. The housing or frame 12 also supports one or more springs 18 therein. A monolithic or unitary spring 18 having a top or first coiled length 20 and bottom or second coiled length 22 which are spaced apart and connected by a length 24 of uncoiled spring material may be utilized. That is, a wire material has a linear length co-extending substantially with a length of the housing 12 and ends of the wire material are coiled to form a coil spring 20, 22 on each end of the spring 18.

One or more batteries 16 are positioned along the length of the spring 18 coextending along the length the of housing 12 and between the top and bottom coiled length 20, 22. The spring 18 and batteries 16 are thus retained within the assembly 10. The one or more batteries 16 may be removably inserted in to the frame 12 by way of the opening(s) 14. The frame may also have a floor section 42 sufficient to retain and/or bias the spring there against with or without the use of a cap 40 and it is also contemplated that the frame has an open bottom section and a cap 40 provides a removable floor surface to the frame 12.

The top of the spring 18 or first coiled length 20 of the spring 18 serves a primary light source 28 activation function. The bottom of the spring 18 or the second coiled length 22 completes an electrical circuit when the push button LED light source 28 is pressed to illuminate the light source 28. When the push button LED light source 28 is allowed to return to its original position the circuit is broken, and the light is shut off. This assembly 10 further eliminates the presence of small individual spring components that could easily be lost or misplaced or slip out of alignment.

The frame 12 further comprises an upper end 26 which is configured to support and/or receive a light source 28 therein such that the light source 28 is positioned on top of or above the first coiled end 20 of the spring 28 when assembled. The light source 28 may be a push-button LED light source where the light source is positioned on a top of the insert 10 and thus a top of the handle of the laryngoscope for illuminating a blade installed on the laryngoscope and engaged with the handle.

In the embodiment illustrated, the light source 28 is a push-button light source and may be provided in a housing 32 that is linearly displaceable and can be lowered or pressed to expose the light source 28 concurrently with compressing the spring 18 and activating the light source 28. A bottom surface of the light source 28 is provided with electrical contacts for contacting the spring and completing a circuit with the power source. A lower end 30 of the housing 12 is configured to receive the second coiled end 22 of the spring and the length connecting said ends 20, 22 extends along the length of the housing and the lower end 30 has a surface or floor 42 to bias the spring 18 for compression of the spring to complete a circuit with the one or more batteries 16 therein and activate the light source 28. A cap 40 may also be provided on the lower end 30 of the frame to enclose a portion of the lower end 30 and/or retain the lower coiled length 22 in place within the frame 12.

As illustrated in FIGS. 1-4, the housing 12 may further support an activation guide 34 which may be positioned on the upper end 26 of the frame and above and the spring 18. The activation guide 34 retains the light source in an installation position during activation and ensures smooth and continuous activation of the light source 28 when the light source 28 housing is depressed for activation. The activation guide 34 is provided for or with a protrusion 36 extending from a depressible surface of the light source 28 wherein the protrusion is slidable within a slot 38 on the frame 12. That is, the light source 28 housing is slidable in reciprocal directions to compress and relax the spring 18 respectively and the protrusion 36 prevents rotation and side to side movement of the light source 28 during activation and deactivation as the protrusion limits movement of the light source to vertical movement per the length of the slot 38 in the frame 12. The slot 38 extends a length along the upper end of the frame 12 as illustrated in further detail in FIG. 4. The activation guide 34 may comprise one or more protrusions 36 in slots 38, for example, two protrusions 36 and two corresponding slots 38 provided on opposing sides of the frame 12.

The frame 12 may be a 3D printed, injection molded, machined, or other unitary construction comprised of a plastic, metal, composite, medical grade material, or combinations thereof. Elements removably securable to the frame 12 may comprise the light source housing 32, floor 42, cap 40 or combinations thereof. These elements may be secured by way of fasteners 44 such as pins or other suitable fasteners, including fasteners 46 which allow for reciprocal sliding of connected components.

The laryngoscope when assembled comprises a handle and supports a blade. The insert can be a stand-alone insert that can be removably inserted into a laryngoscope handle having an open top for a light source. The handle and insert may be used with various sized blades wherein the blades are single-use, disposable blades. The handle has a first end and a second opposing end which terminates in a handle head portion which is configured for operable connection with the blade. A gripping or use length extends between the first and second ends of the handle. In operation, a user holds the laryngoscope at or around the handle. The mini handle laryngoscope is compatible with the insert described herein.

Although the present disclosure has been described with reference to preferred embodiments, workers skilled in the art will recognize that changes may be made in form and detail without departing from the spirit and scope of the disclosure.

The invention claimed is:

1. A removable insert for a laryngoscope handle, the removable insert comprising a frame supporting a light source, a light source activation guide, a spring, and one or more batteries therein wherein the one or more batteries are positioned between a top and a bottom of the spring and wherein the light source activation guide is located on an upper end of the frame above the top of the spring,
  wherein the light source activation guide comprises a slot extending along a length of the upper end of the frame, wherein the upper end of the frame slidably supports the light source therein,
  wherein the light source is provided in a housing that is slidable within the upper end of the frame and wherein the housing comprises a protrusion on an external surface thereof that is slidable in reciprocal directions within the slot of the light source activation guide, and
  a second slot extending along the length of the upper end of the frame and wherein the housing comprises a second protrusion on an external surface thereof that is also slidable in reciprocal directions within the second slot of the light source activation guide.

2. The insert of claim 1 wherein the light source is a push button LED light source, and the light source is configured to be pressed against the top of the spring and retained in positioned by the light source activation guide to continuously activate the light source when the light source is depressed.

3. The insert of claim 1 wherein the frame comprises one or more openings for removable insertion of one or more batteries between the top and the bottom of the spring.

4. The insert of claim 1 wherein the spring comprises a top coiled length and a bottom coiled length spaced apart by a non-coiled length and wherein the spring is positioned in the frame and wherein the one or more batteries are positioned in the frame between the top coiled length and bottom coiled length of the spring.

5. A removable laryngoscope light source with light activation guide assembly comprising:
  a light source provided in a light source housing, the light source housing having two or more protrusions on an external surface of the light source housing;
  a frame having an upper end configured to slidably receive the light source housing therein and having two or more vertical slots along a length of the upper end, wherein the two or more protrusions are slidably coupled to the two or more slots for guiding reciprocal movement of the light source housing during activation of the light source,
  wherein the frame further comprises a lower end providing a floor and a length therebetween, the length having one or more openings therein and wherein the frame receives and supports a spring and one or more batteries therein.

6. The assembly of claim 5, wherein the one or more batteries are positioned between a top coiled length and a bottom coiled length of the spring.

7. The assembly of claim 5 wherein the frame and light source are removably insertable into a cavity in a handle of a laryngoscope.

* * * * *